UNITED STATES PATENT OFFICE.

WILHELM HERZBERG, OF WILMERSDORF, AND WERNER LANGE, OF TREPTOW, GERMANY, ASSIGNORS TO ACTIEN GESELLSCHAFT FÜR ANILIN FABRIKATION, OF BERLIN, GERMANY.

DIAZOTIZABLE DISAZO DYES FOR COTTON.

1,078,503.   Specification of Letters Patent.   Patented Nov. 11, 1913.

No Drawing.   Application filed October 21, 1912.   Serial No. 727,013.

*To all whom it may concern:*

Be it known that we, WILHELM HERZBERG and WERNER LANGE, citizens of the German Empire, residing, respectively, at Wilmersdorf, near Berlin, Germany, and Treptow, near Berlin, Germany, have invented new and useful Improvements in Diazotizable Disazo Dyes for Cotton, of which the following is a specification.

According to the present invention new cotton dyes are obtained by combining one molecular proportion of a symmetrical 3.3'-diaminodiarylurea of the benzene series with one molecular proportion of each of two different diazo compounds of which one is derived from a basic amin, the other from an amino-acid. The disazo dyes obtained in this manner, and corresponding to the general formula:

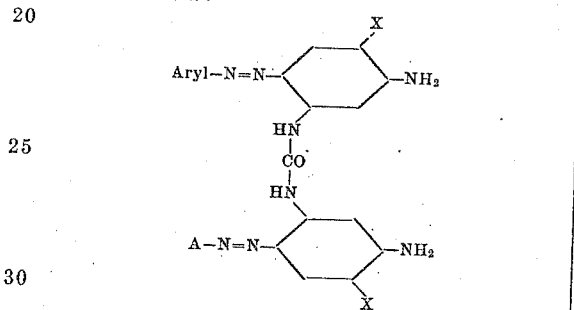

where X represents a univalent radical and A the residue of an aromatic acid, dye cotton directly yellow to orange, they can be diazotized on the fiber and coupled with suitable components. When they are developed with 2-naphthol powerful Bordeaux to red-brown tints are produced of good fastness to washing.

1. 173 parts by weight of sulfanilic acid are diazotized and mixed with a cooled hydrochloric acid solution of 270 parts of 3.3'-diaminoditolylurea. The free mineral acid is slowly neutralized by means of sodium acetate. When the combination is complete the intermediate product is coupled with a diazo solution prepared from 93 parts of anilin, the mineral acid being absorbed by sodium acetate. The dye is filtered, converted into its sodium salt by dissolving it with sodium carbonate, salted out, drained and dried.

2. 207 parts of 3-chloroanilin-6-sulfonic acid are diazotized in the usual manner and added to a cooled hydrochloric acid solution of 242 parts of 3.3'-diaminodiphenylurea. In the course of several hours a solution of sodium acetate is allowed to run into the mixture until the free mineral acid has disappeared. As soon as no more diazo compound is to be recognized there is added a diazo solution prepared from 127 parts of 2-chloro-anilin. The mineral acid is again bound by adding sodium acetate and the whole is stirred until combination is complete. The dye is drained, dissolved with aid of sodium carbonate in hot water and salted out. It corresponds to the formula:

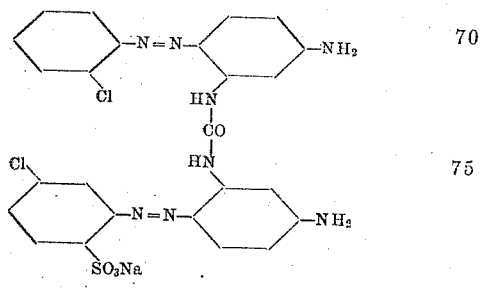

The dyes obtainable by the above described process are in the dried and pulverized shape of their sodium salts orange powders, easily soluble in water to a yellow solution, not changing the color on the addition of soda-lye or ammonia. From the solution hydrochloric acid precipitates the brown dye acid. The dyes are difficultly soluble in alcohol; they dissolve in concentrated sulfuric acid with a brown-red color, on addition of ice being separated as brown flakes. By heating with zinc dust the aqueous solution is decolorized, the dye being split off yielding the aminoaryl compounds from which the diazo compounds were prepared, besides a symmetrical 3.3'.6.6'-tetraaminodiarylurea.

Having now described our invention and the manner in which it may be performed what we claim is,—

1. The herein-described process for the manufacture of diazotizable disazo dyes for cotton by combining one molecular proportion of a symmetrical 3.3'-diaminodiarylurea of the benzene-series with one molecular proportion of each of two different diazo compounds of which one is derived from a basic amin, the other from an amino-acid.

2. The herein-described new disazo-dyes of the formula:

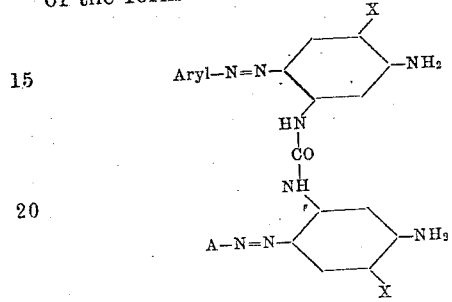

where X represents a univalent radical and A the residue of an aromatic acid, as pulverized dry sodium salts being orange powders, easily soluble in water to a yellow, in concentrated sulfuric acid to a brown-red solution, by reduction yielding a basic aromatic amin, an aromatic amino-acid and a symmetrical 3.3'.6.6'-tetraaminodiarylurea.

3. The herein described new disazo dye having as sodium salt the formula:

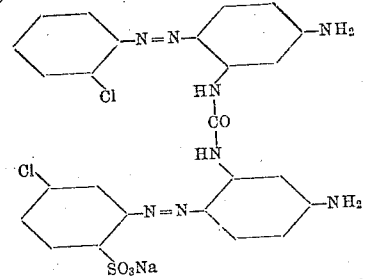

being an orange powder, easily soluble in water to a yellow, in concentrated sulfuric acid to a brown-red solution, by reduction yielding 2-chloroanilin, 3-chloroanilin-6-sulfonic acid and symmetrical 3.3'.6.6'-tetraaminodiphenylurea.

In testimony whereof we have signed our names to this specification in the presence of two subscribing witnesses.

WILHELM HERZBERG.
WERNER LANGE.

Witnesses:
HENRY HASPER,
WOLDEMAR HAUPT.